United States Patent [19]
Ott et al.

[11] Patent Number: 5,242,075
[45] Date of Patent: Sep. 7, 1993

[54] SELF-CLOSING CAP FOR THE FILLER NECK OF THE OIL PAN OF AN ENGINE

[75] Inventors: Siegfried Ott, Traunstein-Hufschlag; Franz Mayer, Mengkofen, both of Fed. Rep. of Germany

[73] Assignee: Mecrom Ott & Holey OHG, Hufschlag, Fed. Rep. of Germany

[21] Appl. No.: 723,912

[22] Filed: Jul. 1, 1991

[30] Foreign Application Priority Data

Feb. 5, 1991 [DE] Fed. Rep. of Germany ....... 9101290

[51] Int. Cl.⁵ ..................... B65D 47/00; B65D 51/18
[52] U.S. Cl. ...................... 220/361; 220/253; 220/254; 220/336; 220/344; 220/86.1; 222/507; 222/517; 222/557; 184/92; 184/95; 184/105.1
[58] Field of Search ............ 220/361, 253, 254, 255, 220/336, 344, 348, 86.1, 86.2, DIG. 33, DIG. 32; 222/517, 507, 557; 184/88.1, 92, 93, 94, 95, 105.1

[56] References Cited

U.S. PATENT DOCUMENTS

| | | | |
|---|---|---|---|
| 1,720,551 | 7/1929 | Heiter | 222/517 X |
| 1,789,955 | 1/1931 | Brownson | 222/507 |
| 1,993,493 | 3/1935 | Vanderveld | 222/517 X |
| 2,082,691 | 6/1937 | Farrelly | 222/507 X |
| 2,095,042 | 10/1937 | Thorn | 222/507 |
| 2,106,364 | 1/1938 | Thorn | 222/507 |
| 2,108,063 | 2/1938 | Hothersall | 222/507 |
| 2,121,554 | 6/1938 | Thorn | 222/507 X |
| 2,131,079 | 9/1938 | Thorn | 222/507 |
| 2,170,955 | 8/1939 | Thorn | 222/507 |
| 2,206,948 | 7/1940 | Frankford | 220/336 X |
| 2,281,620 | 5/1942 | Rueger | 220/336 X |
| 2,302,972 | 11/1942 | Nuckols | 222/517 |
| 2,538,946 | 1/1951 | Nyden et al. | 220/254 X |
| 2,630,240 | 3/1953 | Gates | 220/253 |
| 3,235,145 | 2/1966 | Spier | 222/517 X |
| 3,506,216 | 4/1970 | Delamater | 220/336 X |
| 3,563,368 | 2/1971 | McHugh | 220/336 X |
| 4,141,461 | 2/1979 | LaChance | 220/253 |
| 4,203,527 | 5/1980 | LaChance, Sr. | 220/253 |
| 4,489,860 | 12/1984 | Flider | |
| 4,986,097 | 1/1991 | Derman | 220/253 X |
| 5,064,086 | 11/1991 | McEntee | 220/253 |

FOREIGN PATENT DOCUMENTS

| | | |
|---|---|---|
| 0248673 | 12/1987 | European Pat. Off. . |
| 0311756 | 4/1989 | European Pat. Off. . |
| 401459 | 12/1990 | European Pat. Off. . |
| 861666 | 1/1953 | Fed. Rep. of Germany . |
| 2430253 | 1/1975 | Fed. Rep. of Germany . |
| 2440986 | 3/1975 | Fed. Rep. of Germany . |
| 2530016 | 1/1977 | Fed. Rep. of Germany . |
| 3602844 | 1/1987 | Fed. Rep. of Germany . |
| 3734782 | 5/1989 | Fed. Rep. of Germany . |
| 3918947 | 12/1990 | Fed. Rep. of Germany . |
| 4026869 | 4/1991 | Fed. Rep. of Germany . |
| 2-14986 | 1/1990 | Japan . |

Primary Examiner—Allan N. Shoap
Assistant Examiner—Vanessa Caretto
Attorney, Agent, or Firm—Sixbey, Friedman, Leedom & Ferguson

[57] ABSTRACT

A self-closing cap for the filler neck of an oil pan is provided which allows the oil pan of an engine to be filled without the necessity of removing the cap. The cap comprises a lower body having a flat inner bottom surface with a passage in it, and a spring-loaded closing plate that likewise includes an opening. The closing plate is slidably movable over the flat inner bottom surface o the lower body against the force of the spring by means of a handle such that its opening is alignable with the opening in the bottom surface of the lower body to form an oil receiving passage.

9 Claims, 1 Drawing Sheet

SELF-CLOSING CAP FOR THE FILLER NECK OF THE OIL PAN OF AN ENGINE

FIELD OF THE INVENTION

This invention relates to a self-closing cap for the filler neck of the oil pan of an engine having a spring-biased closing plate which is slidably movable over an oil-receiving passage in the cap in a transverse direction.

Self-closing caps for the filler necks of the fuel tanks of automobiles and trucks are known in the prior art. An example of such a self-closing cap is disclosed in German patent DE 3918947-Al, which discloses a cap body having a centrally-located closing plate which is pivotally mounted on an axle. This axle is mounted to the side of an internal passage present in the lower body of the cap. A spring surrounding the axle includes a first end which is secured to the lower body of the cap, and a second end which urges the closing plate of the cap into a closed position over the upper end of the internal passage. When the nozzle of a gasoline pump is inserted through the internal passage within the cap, the closing plate is pivotally moved to the side of the passage into the lower body. When the nozzle is pulled out, the closing plate is urged back into the closed position by the spring.

Such cap structures necessarily require a considerable height to accommodate the pivoting motion of the closing plate, and therefore are not suitable for installation on the filler neck of the oil pan of an engine, because of the limited amount of space under the hood of the automobile or truck. Further the closing plate is only urged into a closed position by a relatively lightweight spring such that the heavy vibrations caused by the engine could endanger the seal between the closing plate and the upper end of the passage in the cap if such a gas tank filler cap were used for an oil pan or a valve sealing cap. Finally, dirt which accumulates on the closing plate of such a prior art cap could not be wiped off without running the risk that such dirt would get into the oil supply of the engine whenever the closing plate were pivotally moved downwardly incident to the opening of the cap.

The applicant has observed that the operators of cars and trucks occasionally forget to replace the oil pan cap, and sometimes replace it improperly such that there is no effective seal between the cap and the filler neck. In such instances, oil can escape from the engine, which in turn can result in severe engine damage. Accordingly, there is a need for a self-closing cap for the filler neck of engine oil pans that serves essentially the same purposes as known filler caps for fuel tanks.

It is accordingly an object of this invention to provide a cap for the filler neck of oil pans of engines which is characterized by a relatively short height, the ability to hold a seal despite exposure to heavy engine vibrations, and which includes an outer surface which can be cleaned without causing dirt to fall into the oil supply in the engine. It is a further object of the invention to provide an oil cap with all the aforementioned features which can serve as a problem-free replacement for conventional oil caps, and which is simple in structure and relatively easy and inexpensive to manufacture.

In the inventive filler cap, the closing plate is not movable downwardly around an axle which is located to the side of the passage. Rather, the closing plate is pivotally slidable over the opening of the cap body in a sideways motion generated when the upper body of the cap is twisted with respect to the lower body. The structure of the invention allows the upper surface of the closing plate to be cleaned without running any risk of pushing dirt into the engine. The new way of moving the closing plate also makes it possible to build the cap with a much lower height than prior art filler caps intended for gasoline tanks. In addition, vibrations cannot cause the opening plate to move out of sealing engagement with the upper body of the cap; only a considerable movement of the closing plate could lead to a partial opening of the cap and the vibrations of the engine are not strong enough to cause this. As the upper body and the lower body of the cap are close together, the closing plate is only movable in response to a deliberate, twisting motion applied to the upper body of the cap so that it is practically insensitive to vibrations.

The movability of the closing plate is easily achieved with an axle which is positioned at right angles to the inner bottom surface and at the side of the nozzle-receiving passage in the cap body. This results in a simple construction of the cap which is again easily manufactured.

For the necessary sealing of the cap there are two ring gaskets on both sides of the closing plate that are partially received in ring-shaped grooves in the upper body and in the lower body, respectively. Such gaskets improve the ability of the opening in the closing plate to be correctly positioned over the nozzle-receiving passage in the cap body. Even when the upper and lower bodies are close together, the closing plate can be easily slidably moved between them because of the elasticity of the gaskets.

For the movable positioning of the closing plate and for the positioning of a spring which urges the closing plate into a closed position, there are pins in the lower body of the cap. It is also possible to form the axle in the closing plate or to fix it and position it in a fitting mold in the lower body.

To assist in the alignment of the openings in the closing plate and in the body of the cap, there is a vertical leg around the lower body's side that points at the upper body. The inner side of the vertical leg forms stops for the closing plate.

There can be a circle-shaped inner contour of the vertical leg and an outer contour of the closing plate that is shaped like a lens with two arcs having a diameter approximately corresponding to the diameter of the inner contour of the vertical leg and which are connected by the thin ends of the closing plate, in one of which the axle is positioned. This feature further leads to a simple construction and a low production cost.

The lower and upper body are twistable relative to one another through a screw thread, which also serves as a mutual securing means. As previously mentioned, the closing plate is movable by screwing the upper body relative to the lower body of the cap. The rotational symmetry of the upper and lower body of the cap makes an unstressed production of the parts possible - e.g., by injection molding.

In order to make the closing plate movable by screwing the upper body against the lower body, there is a simple slot in the closing plate so that the pin that sticks in the covering face of the upper body can mesh with it and so there is no need of other measures for the realization of the movability of the closing plate, which would cause further complexity of manufacture and time.

The spring that urges the closing plate back into the closing position can be of any kind, but a coil spring that is positioned on a special pin is recommended. The ends of this coil spring are splayed and it works as a torsional spring. Instead of a mechanical spring a "magnetic" spring can also be used; this is a spring that moves the closing plate into the closing position by attracting and repelling. In this case the closing plate must be made of a magnetic attractable material. This is not so when the magnet is positioned on the closing plate, because then a material which is interacting with the magnet has to be positioned on the opposite side, at the body.

Instead of a connection all around, the lower and the upper body can also only be connected at some points so that a means for moving the closing plate can be inserted. Of course also in this case the closing plate can be urged back into the closing position by a spring means. Apart from the fact that the upper and the lower body are only connected at some points, all other aforementioned characteristics can be realized with the exception of moving the closing plate by twisting both bodies against each other with the upper body having a direct effect on the closing plate.

Instead of the aforementioned thread between the upper and the lower body there can be a surrounding groove on the one part and a surrounding rib on the other, which engage each other. With this construction the bodies can also be twisted. If there is a thread, it should be of such a kind that—when both bodies are screwed against each other—they move apart when the closing plate is moved into the opening position, and move towards each other when the closing plate is moved into its closing position.

BRIEF DESCRIPTION OF THE SEVERAL FIGURES

FIG. 1 illustrates the cap for the filler neck of the oil pan of an internal combustion engine. This is the side elevation of the cap detached from the upper body.

FIG. 2 an elevation through line II-II of FIG. 1.

DETAILED DESCRIPTION OF THE PREFERRED EMBODIMENT

Figure 1:
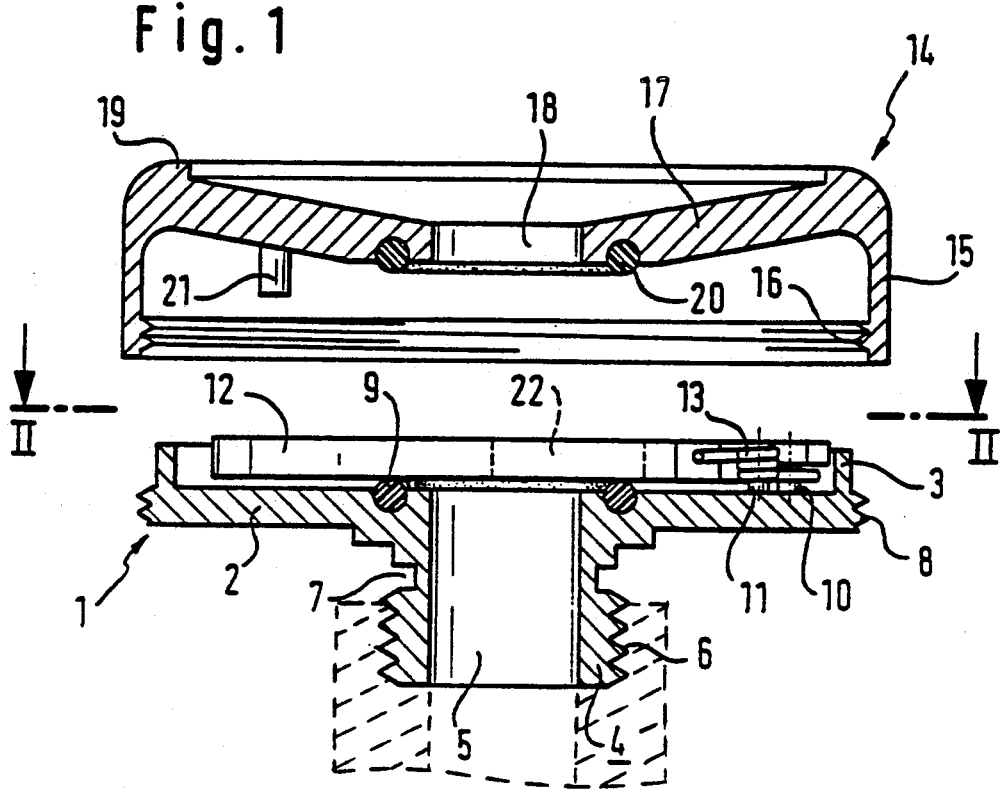

Hereinafter the description concerning space and direction like e.g., "on the top", "below" or "at the bottom" etc. are used with reference to the orientation of the invention in the drawing. The spacial position of the cap on the cylinder head of an engine is in accordance with FIG. 1.

A lower body 1 has got a flat and a mainly circle-shaped inner bottom surface 2, close to the circumference of which there is a vertical leg 3 pointing upwards and on the underside of which there is a hollow nozzle 4. The lower body 1 has got a passage 5 which is connected to the inner side of the hollow nozzle 4, which has got a thread on the outer side. The thread of the hollow nozzle 4 is engageable with a complementary thread in the oil pan filler neck of an engine, shown in phantom. This thread is limited at the top by a ring groove 7 where a ring gasket and/or a securing thread (not shown in the drawing) are positioned.

On the outer side of the lower body 1 there is an outer thread 8 which has a longer circumference than the vertical leg so that it can be screwed on an inner thread.

On the inner bottom surface 2 around the passage 5 in a ring-shaped groove there is an O-ring gasket 9 which projects slightly from the inner bottom surface 2.

From the inner bottom surface 2 two pins 10 and 11 are projecting upwardly, one of which is the axle 10 for the closing plate and the other of which is the holder for the spiral part of the spring means 13, one leg of which presses against the axle and the other one against the closing plate 12. The closing plate rests—with its flat side parallel to the inner bottom surface 2—on the O-ring gasket.

The upper body 14 which is shaped like a short tin without a bottom has an inner thread 16 which is positioned on the inner side 15 and near the edge at the bottom and which can be screwed on the outer thread 8 of the lower body 1. On the top the upper body is closed by an inner covering surface 17 with a passage 18 in the middle which is aligned with the passage 5 in the lower body. The outer surface of the upper body which is opposite the inner covering surface 17 is hollowed around the passage 18. This hollow is surrounded by a ring bead 19. Around the passage 18 of the inner covering surface 17 an O-ring gasket 20 is positioned in a groove so that the gasket 20 slightly projects from the covering surface 17. Both surfaces of the closing plate 12 that are positioned opposite each other are so smooth that—together with the O-ring gaskets 9,20—they work as sealing surfaces. Gaskets 9,20 can only seal when both bodies 1 and 14 are screwed together.

From the inner covering surface 17 a pin 21 projects downwards and meshes in the groove 23 of the closing plate 12 and helps to move the closing plate 12 by the upper body 14.

For the assembly of the cap, the spring 13 is first fixed on pin 11 and then the closing plate is fixed on pin 10. Next, one of the legs of the spring 13 is positioned against a side surface of the closing plate 12. Then the upper body 14 is screwed on the lower body 1 so that a drill-hole (not shown) in the upper body 14 that receives the pin 21 is aligned with the groove 25 in the closing plate so that pin 21 can be pressed into the groove from the upper body.

Figure 2:
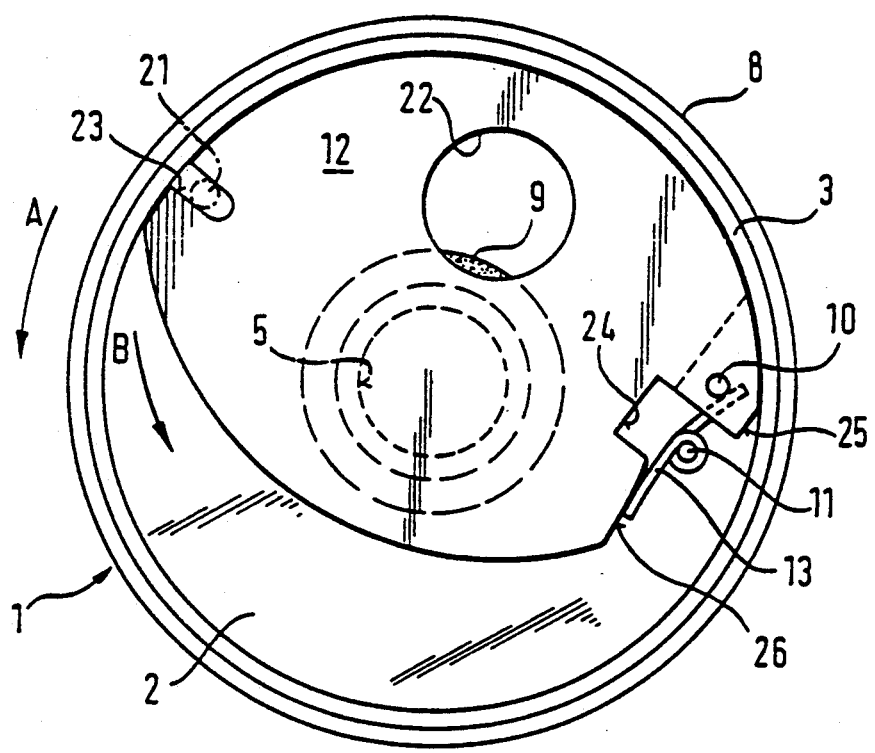

The closing plate 12 is shown in detail in FIG. 2. Its outer contour is shaped like a lens and defined by two arcs which are connected through the rather thin ends of the closing plate. At one of these ends there is a clearly recognizable gap for the spring 13. The diameter of both arcs corresponds to the inner diameter of the vertical leg 3 of the lower body. The axle 10 of the closing plate 12 is fixed so that the closing plate 12 adjoins one of the arcs at the inner contour of the vertical leg 3 in its closing or opening position. In the closing plate there is a passage 22 which aligns with passages 5 and 18 when it is in the opening position. But when it is in the closing position, the passage 22 is moved into a position which does not align with passages 5 and 18 or their ring gaskets so that the said passages are sealed by the said gaskets on the surface that faces the closing plate 12. Consequently, there is no connection between passage 5 of the lower body 1 and passage 18 of the upper body 14.

The aforementioned groove 23 and the required drill-hole in the upper body 14 are at the end areas of the closing plate 12 that are positioned opposite each other. The groove 23 starts near the end area from that arc which adjoins to the inner contour of the vertical leg 3 when it is in the closing position. The groove 23 extends in direction of the other end area of the closing plate 12.

On the closing plate 12, opposite the groove 23, there is a gap 24 where the spring 13 can be fixed. There also is a bevel 25 in order to ensure a movement of the closing plate 12 that is unhindered by the vertical leg 3.

Around the axle 10 the closing plate 12 is thinner and forms a step. The space which is gained herewith is for the leg of the spring 13 which presses against the axle 10. The other leg of the spring 13 is bent downwards to the height of half of the thickness of the closing plate 12 and it is positioned in a groove (which is not shown on the drawing) in area 26 of the closing plate 12. Apart from the pins 10, 11 and 21 and the ring gaskets 9 and 20 all parts should be made of oil-and-heat resistant materials.

In order to pour e.g. oil into a filler neck which is closed by this cap, the upper body has to be screwed into the indicated direction A, against the lower body. Herewith the pin 21 moves the closing plate 12 against the spring until it reaches the opening position. When the closing plate 12 reaches the inner side of the vertical leg 3 the upper body 14 cannot be screwed against the lower body any longer. An oil fill nozzle is then inserted through the opening defined by the three aligned passageways 5, 22 and 18. After the nozzle is pulled out, the spring 13 moves the closing plate back into the closing position when the upper body 14 is screwed back.

When threads 8 and 16 are right-handed threads, the space between upper body 14 and lower body 1 is slightly decreased when the upper body is screwed into the indicated direction A so that also the pressure of the ring gaskets 9 and 20 against the closing plate is slightly reduced. This makes the screwing of the upper body 14 into the indicated direction easier and improves the effect of the gaskets 9 and 20 when it is moved into the closing position.

I claim:

1. A self-closing cap for a filler neck of a liquid container, comprising a lower body with a flat inner bottom surface with a passage in it, a closing plate which can be moved from a closing position to an opening position and which is urged into the closing position by a spring, a ring gasket between the closing plate and the inner bottom surface for fluidly sealing the passage in the lower body against the closing plate when said plate is in said closing position, and an upper body disposed over the lower body and movable with respect to said lower body, wherein said closing plate is slidably movable between the lower and upper body, and is connected to said upper body in order to be moved into an opening position against the urging of a spring and which has a passage which is alignable with the passage of the inner bottom surface and a passage in the upper body when the closing plate is moved into an opening position, wherein said closing plate is movable around an axle which is placed at right-angle to a lower bottom surface of the lower body and beside said passage of said lower body, and wherein said bottom surface includes two pins, one of which holds said spring and the other one of which is the axle of the closing plate.

2. The cap of claim 1, wherein said closing plate rests on a gasket which is placed into a groove surrounding the passage of the inner bottom surface of the lower body, respectively.

3. The cap of claim 1, further comprising a vertical flange around the lower body pointing at the upper body, said flange having an inner side which encloses the closing plate and which forms a stop for the opening and the closing position.

4. The cap of claim 3, wherein said vertical flange includes a circular inner contour, and said closing plate includes a contour similar to a lens with two arcs having a contour substantially corresponding to the contour of the inner side of the vertical flange and which are connected by a narrow end of the closing plate, the narrow end also being connected to the axle.

5. The cap of claim 1, wherein the upper body can be screwed against the lower body by a means of a thread which also functions to secure the upper and lower body together and wherein the closing plate can be slidably moved by screwing the upper body against the lower body.

6. The cap of claim 5, further comprising a groove on one side of the closing plate which is facing the upper body, and in which a pin projecting from the upper body is meshing.

7. The cap of claim 1, wherein the lower body, the upper body and the closing plate are all made of oil-resistant and heat-resistant material.

8. A self-closing cap for a filler neck of a liquid container, comprising a lower body with a flat inner bottom surface with a passage in it, a closing plate which can be moved from a closing position to an opening position and which is urged into the closing position by a spring, a ring gasket between the closing plate and the inner bottom surface for fluidly sealing the passage in the lower body against the closing plate when said plate is in said closing position, and an upper body disposed over the lower body and movable with respect to said lower body, wherein said closing plate is slidably movable between the lower and upper body, and is connected to said upper body in order to be moved into an opening position against the urging of a spring and which has a passage which is alignable with the passage of the inner bottom surface and a passage in the upper body when the closing plate is moved into an opening position, wherein said lower body includes a hollow nozzle on a side opposite from the closing plate, said hollow nozzle having a securing means including a screw thread.

9. The cap of claim 8, wherein the hollow nozzle includes means for sealing and securing the thread between a filler neck and the hollow nozzle.

* * * * *